(12) United States Patent
Mikhaylik (10) Patent No.: US 7,354,680 B2
(45) Date of Patent: *Apr. 8, 2008

(54) ELECTROLYTES FOR LITHIUM SULFUR CELLS

(75) Inventor: Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 506 days.

This patent is subject to a terminal disclaimer.

(21) Appl. No.: 10/752,876

(22) Filed: Jan. 6, 2004

(65) Prior Publication Data

US 2005/0147891 A1 Jul. 7, 2005

(51) Int. Cl.
*H01M 6/16* (2006.01)

(52) U.S. Cl. .................. 429/326; 429/339; 429/218.1; 429/231.95; 429/329; 429/340; 429/341; 429/337

(58) Field of Classification Search ................ 429/326, 429/339, 218.1, 231.95, 329, 340, 341, 337
See application file for complete search history.

(56) References Cited

U.S. PATENT DOCUMENTS

| | | | |
|---|---|---|---|
| 4,264,689 A | 4/1981 | Moses | |
| 4,410,609 A | 10/1983 | Peled et al. | |
| 4,816,358 A | 3/1989 | Holleck et al. | |
| 4,857,423 A | 8/1989 | Abraham et al. | |
| 5,021,308 A | 6/1991 | Armand et al. | |
| 5,352,967 A | 10/1994 | Nutz et al. | |
| 5,514,493 A | 5/1996 | Waddell et al. | |
| 5,529,860 A | 6/1996 | Skotheim et al. | |
| 5,601,947 A | 2/1997 | Skotheim et al. | |
| 5,686,201 A | 11/1997 | Chu | |
| 5,690,702 A | 11/1997 | Skotheim et al. | |
| 5,882,812 A | 3/1999 | Visco et al. | |
| 5,900,718 A | 5/1999 | Tsenter | |
| 5,919,587 A | 7/1999 | Mukherjee et al. | |
| 6,017,651 A | 1/2000 | Nimon et al. | |
| 6,025,094 A | 2/2000 | Visco et al. | |
| 6,030,720 A | 2/2000 | Chu et al. | |
| 6,060,184 A | 5/2000 | Gan et al. | |
| 6,117,590 A | 9/2000 | Skotheim et al. | |
| 6,136,477 A | 10/2000 | Gan et al. | |

(Continued)

FOREIGN PATENT DOCUMENTS

WO     WO 02/067344     8/2002

OTHER PUBLICATIONS

Peled et al., "The Electrochemical Behavior of Alkali and Alkaline Earth Metals in Nonaqueous Battery Systems", *J. Electrochem. Soc.*, vol. 126, pp. 2047-2051 (1979).

(Continued)

*Primary Examiner*—Laura Weiner
(74) *Attorney, Agent, or Firm*—David E. Rogers; Squire, Sanders & Demspey LLP (57) ABSTRACT

Disclosed is an additive for an electrochemical cell wherein the additive includes an N—O bond. The additive is most preferably included in a nonaqueous electrolyte of the cell. Also disclosed are cells and batteries including the additive, and methods of charging the batteries and cells. An electrochemical cell including the additive preferably has an anode that includes lithium and a cathode including an electroactive sulfur-containing material.

45 Claims, 5 Drawing Sheets

U.S. PATENT DOCUMENTS

| | | | |
|---|---|---|---|
| 6,153,337 | A | 11/2000 | Carlson et al. |
| 6,194,099 | B1 | 2/2001 | Geronov et al. |
| 6,201,100 | B1 | 3/2001 | Gorkovenko et al. |
| 6,210,831 | B1 | 4/2001 | Gorkovenko et al. |
| 6,210,839 | B1 | 4/2001 | Gan et al. |
| 6,225,002 | B1 | 5/2001 | Nimon et al. |
| 6,329,789 | B1 | 12/2001 | Gavrilov et al. |
| 6,406,815 | B1 | 6/2002 | Sandberg et al. |
| 6,436,583 | B1 | 8/2002 | Mikhaylik |
| 2002/0192557 | A1* | 12/2002 | Choi et al. ............... 429/218.1 |

OTHER PUBLICATIONS

Rao et al., "Effect of Sulfur Impurities on $Li/TiS_2$ Cells", *J. Electrochem. Soc.*, vol. 128, pp. 942-945 (1981).

Peled et al., "Lithium-Sulfur Battery: Evaluation of Dioxolane-Based Electrolytes", *J. Electrochem. Soc.*, vol. 136, pp. 1621-1625 (1989).

Narayanan et al., "Analysis of Redox Additive-Based Overcharge Protection for Rechargeable Lithium Batteries", *J. Electrochem. Soc.*, vol. 138, pp. 2224-2229, (1991).

Golovin et al., "Applications of Metallocenes in Rechargeable Lithium Batteries for Overcharge Protection", *J. Electrochem. Soc.*, vol. 139, pp. 5-10, (1992).

Alamgir et al., "Room Temperature Polymer Electrolytes", *Industrial Chemistry Library, vol. 5, Lithium Batteries: New Materials, Developments and Perspectives*, Chapter 3, pp. 93-136, Elsevier, Amsterdam, 1994.

Dominey, "Current State of the Art on Lithium Battery Electrolytes", *Industrial Chemistry Library, vol. 5, Lithium Batteries: New Materials, Developments and Perspectives*, Chapter 4, pp. 137-165, Elsevier, Amsterdam, 1994.

*Handbook of Batteries*, Linden, $2^{nd}$ edition, chapter 3, pp. 18-19, McGraw-Hill, New York (1995).

*Handbook of Batteries*, Linden, $2^{nd}$ edition, chapter 14, pp. 75-76, McGraw-Hill, New York (1995).

*Handbook of Batteries*, Linden, $2^{nd}$ edition, chapter 36, p. 2, McGraw-Hill, New York (1995).

Richardson et al., "Overcharge Protection for Rechargeable Lithium Polymer Electrolyte Batteries", *J. Electrochem. Soc.*, vol. 143, pp. 3992-2996, (1996).

Chu et al., "High Performance S-type Cathode", Proceedings of the $12^{th}$ Annual Battery Conference, applications and Advances, pp. 133-134, (1997).

Aurbach in *Nonaqueous Electrochemistry*, Chapter 6, pp. 289-366, Marcel Dekker, New York, 1999.

Cheon et al., "Rechargeable Lithium Sulfur Battery: II. Rate Capability and Cycle Characteristics", *J. Electrochem. Soc.*, vol. 150, pp. A800-A805, (2003).

* cited by examiner

ELECTROLYTES FOR LITHIUM SULFUR CELLS

TECHNICAL FIELD

The present invention relates generally to the field of electrochemical cells and batteries, and to an electrolyte for use in an electrochemical cell. More particularly, this invention pertains to electrochemical cells where the cathode preferably comprises an electroactive sulfur-containing material and the anode preferably comprises lithium, and the cells deliver a high percentage of the theoretical discharge capacity, exhibit high charge-discharge efficiency, and/or show low self-discharge rates.

BACKGROUND

There has been considerable interest in recent years in developing high energy density batteries with lithium-containing anodes. Lithium metal is particularly attractive as the anode active material of electrochemical cells because of its light weight and high energy density, as compared, for example, to anode active materials such as lithium intercalated carbon anodes, where the presence of non-electroactive materials increases the weight and volume of the anode, thereby reducing the energy density of the anode. The use of lithium metal anodes, or those comprising lithium metal, provides an opportunity to construct cells that are lighter in weight and have a higher energy density than cells such as lithium-ion, nickel metal hydride or nickel-cadmium cells. These features are highly desirable for batteries in portable electronic devices such as cellular telephones and laptop computers, as noted, for example, by Linden in *Handbook of Batteries*, 1995, $2^{nd}$ Edition, chapter 14, pp. 75-76, and chapter 36, p. 2, McGraw-Hill, New York, and in U.S. Pat. No. 6,406,815 to Sandberg et al., the respective disclosures of which are incorporated herein by reference.

Thin film battery design is particularly suitable for portable electronic devices in that it brings light weight, and the high surface area allows high rate capability as well as reduced current density on charging. Several types of cathode materials for the manufacture of thin-film lithium batteries are known, and include cathode materials comprising sulfur-sulfur bonds, wherein high energy capacity and rechargeability are achieved from the electrochemical cleavage (via reduction) and reformation (via oxidation) of sulfur-sulfur bonds. Sulfur containing cathode materials, having sulfur-sulfur bonds, for use in electrochemical cells having lithium or sodium anodes include elemental sulfur, organosulfur, or carbon-sulfur compositions.

For rechargeable lithium/sulfur (Li/S) cells there is a need for further enhancement of cell performance. Ideally cells should have high utilization at practical discharge rates over many cycles. Complete discharge of a cell over time periods ranging from 20 minutes (3C) to 3 hours (C/3) is typically considered a practical discharge rate. A number of approaches have been explored for the improvement of the performance and properties, such as utilization, self-discharge, charge-discharge efficiency, and overcharge protection.

Lithium anodes in nonaqueous electrochemical cells develop surface films from reaction with cell components including solvents of the electrolyte system and materials dissolved in the solvents, such as, for example, electrolyte salts and materials that enter the electrolyte from the cathode. Materials entering the electrolyte from the cathode may include components of the cathode formulations and reduction products of the cathode formed upon cell discharge. In electrochemical cells with cathodes comprising sulfur-containing materials reduction products may include sulfides and polysulfides. The composition and properties of surface films on lithium electrodes have been extensively studied, and some of these studies have been summarized by Aurbach in *Nonaqueous Electrochemistry*, Chapter 6, pages 289-366, Marcel Dekker, New York, 1999. The surface films have been termed solid electrolyte interface (SEI) by Peled, in *J. Electrochem. Soc.*, 1979, vol. 126, pages 2047-2051.

The SEI may have desirable or undesirable effects on the functioning of an electrochemical cell, depending upon the composition of the SEI. Desirable properties of an SEI in an electrochemical cell comprising a lithium anode include being conductive to lithium ions and at the same time preventing or minimizing lithium consuming reactions, such as those with electrolyte salts, electrolyte solvents, or soluble cathode reduction (discharge) products. Undesirable properties of the SEI may include reduced discharge voltage and reduced capacity of the cell. Soluble cathode reduction products from sulfur-containing cathode materials are known to be very reactive toward lithium anodes indicating that any SEI formed in Li/S cells is typically ineffective in preventing or minimizing lithium consuming reactions (these reactions are often termed lithium corrosion).

Approaches to protect lithium in Li/S cells have been described by Visco et al. in U.S. Pat. No. 6,025,094; by Nimon et al. in U.S. Pat. Nos. 6,017,651 and 6,225,002; and by Skotheim et al. in U.S. patent application Ser. Nos. 09/721,578 and 09/864,890.

Sulfur utilization in Li/S cells is dependent on a number of factors, including among others, formulation of the cathode, discharge rate, temperature, and electrolyte composition. As used herein, "a 100% utilization" (also called "sulfur utilization") assumes that if all elemental sulfur in an electrode is fully utilized, the electrode will produce 1675 mAh per gram of sulfur initially present in the electrode. Among the prior art references that discuss and teach sulfur utilization are the following:

(1) U.S. Pat. No. 4,410,609 Peled et al. claimed to have achieved sulfur utilization of about 90% in Li/S cells employing THF or THF/toluene electrolyte solvents, but only at very low discharge rates (two months for a single discharge).

(2) Peled et al. in *J. Electrochem. Soc.*, 1989, vol. 136, pp. 1621-1625 found that in dioxolane solvent mixtures similar Li/S cells achieve a sulfur utilization of no more than 50% at discharge rates of 0.1 mA/cm$^2$ and 0.01 mA/cm$^2$.

(3) Chu in U.S. Pat. No. 5,686,201 describes a Li/S cell with a polymeric electrolyte that delivers 54% utilization at 30° C. and a low discharge rate of 0.02 mA/cm$^2$. At 90° C. a utilization of 90% at a discharge rate of 0.1 mA/cm$^2$ was achieved.

(4) Chu et al. in U.S. Pat. No. 6,030,720 describe liquid electrolyte Li/S rechargeable cells with sulfur utilization of approximately 40% for more than 70 cycles at discharge rates of 0.09 mA/cm$^2$ (90 μA/cm$^2$) and 0.5 mA/cm$^2$ (500 μA/cm$^2$). Another example (Example 4describes a sulfur utilization of 60% over more than 35 cycles but at the low discharge rate of 0.09 mA/cm$^2$.

(5) Cheon et al. in *J. Electrochem. Soc.*, 2003, vol. 150, pp. A800-A805, describe various properties including rate capability and cycle characteristics of rechargeable Li/S cells. In FIG. 5 are shown charge and discharge profiles for Li/S cells, with 0.5 M lithium triflate in tetraglyme as electrolyte, from which charge-discharge efficiencies can be estimated. A charge-discharge efficiency at the $30^{th}$ cycle of approximately 67% is estimated for cells charged at 0.26 mA/cm$^2$ and discharged at 0.26 mA/cm$^2$ and an efficiency of approximately 48% for cells charged at 0.26 mA/cm$^2$ and discharged at 1.74 mA/cm$^2$. The sulfur utilization of these same cells is shown to be 37% and 28%, respectively, at the 30$^{th}$ cycle.

Many lithium-based electrochemical cells, including Li/S cells, may be recharged by applying external current to the cell. The general mechanism for recharging many lithium rechargeable cells is described by Hossain in *Handbook of Batteries*, 1995, 2$^{nd}$ Edition, chapter 36, p. 1-28, McGraw-Hill, New York, and for Li/S cells by Mikhaylik et al. in *J. Electrochem. Soc.*, 2003, vol. 150, pp. A306-A311. When a cell is recharged it may be unintentionally overcharged, which could lead to various undesirable reactions such as destruction of the cell electrolyte, corrosion of the current collectors, degradation of the cell separators, and irreversible damage to the positive or negative electrode. Overcharge protection has been provided in lithium cells by the use of redox shuttle additives, as described, for example, by Narayanan et al. in *J. Electrochem. Soc.*, 1991, vol. 138, pp. 2224-2229, Golovin et al. in *J. Electrochem. Soc.*, 1992, vol. 139, pp. 5-10, and Richardson et al. in *J. Electrochem. Soc.*, 1996, vol. 143, pp. 3992-3996. The redox shuttle additive species is oxidized at the cathode during overcharge, diffuses to the anode electrode, where it is reduced to the original species and diffuses back.

In Li/S cells an intrinsic redox shuttle is known that provides overcharge tolerance or protection, as described, for example, in U.S. Pat. No. 5,686,201 to Chu. Chu et al. in *Proceedings of the 12$^{th}$ Annual Battery Conference on Applications & Advances*, 1997, pp. 133-134, state that the shuttle in Li/S cells limits overcharging, and provide examples of cell voltage holding constant during extended overcharge as illustrated in FIG. 4 on page 134.

U.S. Pat. No. 5,882,812 to Visco et al. describes a method of protection of rechargeable electrochemical energy conversion devices against damage from overcharge. Specifically, such devices may be characterized as including the following elements: (1) a negative electrode; (2) a positive electrode containing one or more intermediate species that are oxidized to one or more oxidized species during overcharge; and (3) a tuning species that adjusts the rate at which the oxidized species are reduced, thereby adjusting the voltage at which overcharge protection is provided. The oxidized species produced during overcharge move to the negative electrode where they are reduced back to the intermediate species as in a normal redox shuttle. The overcharge protection systems are described as applicable to many different cells, particularly those with alkali metal negative electrodes, including lithium/organosulfur cells, lithium/(inorganic sulfur) cells, lithium/(metal oxide) cells, lithium/(metal sulfide) cells, and carbon anode cells. The tuning species described include organosulfur compounds, and surface active agents including: organoborates such as trimethylborate, boroxines, such as trimethylboroxine; phosphorus containing compounds including polyphosphazenes and phosphates such as $Li_3PO_4$; carbonates such as $Li_2CO_3$; nitrogen containing compounds including nitrates such as $LiNO_3$; and organonitrogen compounds such as phenylhydrazine.

Gan et al. in U.S. Pat. Nos. 6,136,477 and 6,210,839 describe nitrates and nitrites as additives for electrolytes in lithium ion cells to reduce 1$^{st}$ cycle irreversible capacity. In U.S. Pat. No. 6,060,184 Gan et al. describe nitrate additives for nonaqueous electrolytes that provide increased discharge voltage and reduced voltage delay in current pulse discharge, for example in alkali metal cells with SVO (silver-vanadium oxide) positive electrodes.

Redox shuttles in electrochemical cells, however, have also been shown to have an undesirable impact on cell properties, such as leading to self-discharge. Rao et al. in *J. Electrochem. Soc.*, 1981, vol. 128, pp. 942-945, the disclosure of which is incorporated herein by reference, describe the self discharge of Li/TiS$_2$ cells due to the presence of elemental sulfur impurities, which act through a redox shuttle mechanism. The sulfur impurities become part of a polysulfide shuttle. Sulfide ions or low chain polysulfides are oxidized at the cathode to higher polysulfides that are soluble in the electrolyte. These higher polysulfides diffuse through the electrolyte to the anode where they are reduced to lower polysulfides that in turn diffuse back through the electrolyte to the cathode to be reoxidized to higher polysulfides. This redox shuttle causes a continuous current flow in the cell, resulting in a depletion of the cell's stored capacity. This phenomenon is called self-discharge. In U.S. Pat. No. 4,816,358 Holleck et al. describe a method of reducing self-discharge in lithium cells, such as Li/TiS$_2$ cells, which comprise cathodes containing sulfur as an impurity. The method uses scavengers, for example, metals or metal ions, that react with sulfur impurities to form stable sulfides thus reducing self discharge.

For rechargeable batteries, determining the point at which to terminate charging is important for efficient charging, longevity of the battery, and for safety. A number of methods are known for charging batteries and for determining the point of termination of the charge. U.S. Pat. No. 5,900,718 to Tsenter and U.S. Pat. No. 5,352,967 to Nutz et al. summarize some of these charging and charge termination methods particularly useful for nickel batteries, such as nickel-cadmium, nickel-hydrogen and nickel metal-hydride. Prominent among the termination methods are delta temperature/delta time (dT/dt), delta voltage/delta time (dV/dt), and termination at a predetermined voltage.

SUMMARY OF THE INVENTION

The present invention provides electrolytes for lithium/sulfur electrochemical cells that exhibit at least one of (1) low self-discharge rates, (2) high cathode utilization rates, (3) high charge-discharge efficiencies, and/or (4) high specific capacity. The electrolyte compositions comprise one or more N—O compounds in concentrations from about 0.02 m to about 2.0 m. Surprisingly, the example embodiments of Li/S electrochemical cells comprising the N—O electrolyte additives of the present invention show low rates of reaction of cell components with lithium metal of the anode, improved discharge capacity, and high charge-discharge efficiency.

The invention also comprises electrochemical cells and batteries including the electrolyte, batteries that have improved charge/discharge efficiencies, and a method of charging a cell or battery including the electrolyte and/or having improved charge/discharge efficiencies.

DETAILED DESCRIPTION OF THE INVENTION

One aspect of the present invention provides an electrochemical cell comprising: (a) an anode comprising lithium; (b) a cathode comprising an electroactive sulfur-containing material; and (c) a nonaqueous electrolyte; wherein the electrolyte comprises: (i) one or more nonaqueous solvents; and (ii) one or more N—O additives.

Liquid electrolyte lithium/sulfur cells typically comprise an anode comprising lithium, a cathode comprising an electroactive sulfur-containing material, a nonaqueous electrolyte, and a separator interposed between the anode and cathode, as described, for example, in U.S. Pat. No. 6,210,831 to Gorkovenko et al. and U.S. Pat. No. 5,919,587 to Mukherjee et al., the respective disclosures of which are incorporated herein by reference. Following are descriptions of the preferred anode, cathode, separator, electrolyte, and electrolyte additive of an electrochemical cell according to the invention.

Anode

The anode may be of any structure suitable for use in a given electrochemical cell and with a given cathode. Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys. Lithium anodes comprising multi-layer coatings such as those described in U.S. patent application Ser. No. 09/721,578 to Skotheim et al., the disclosure of which that describes lithium anodes is incorporated herein by reference, may also be used.

Cathode Active Layers

The cathode of a cell according to the present invention comprises cathode active layers including an electroactive sulfur-containing material. The preferred cathode active layers are coated onto substrates, such as current collectors, to form composite cathodes, although any cathode structure that includes electroactive sulfur-containing material may be used. The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises elemental sulfur. In another embodiment, the electroactive sulfur-containing material comprises a mixture of elemental sulfur and a sulfur-containing polymer.

Suitable sulfur-containing organic polymers include, but are not limited to, those described in U.S. Pat. Nos. 5,601,947; 5,690,702; 5,529,860; and 6,117,590 to Skotheim et al.; and U.S. Pat. No. 6,201,100 to Gorkovenko et al.; all of a common assignee, and are incorporated herein by reference in their entirety.

The electroactive sulfur-containing cathodes of the present invention may further comprise electroactive metal chalcogenides, electroactive conductive polymers, and combinations thereof, for example, as described in U.S. Pat. No. 5,919,587 to Mukherjee et al. and U.S. Pat. No. 6,201,100 to Gorkovenko et al., the respective disclosures of which that describe sulfur-containing cathodes are incorporated herein by reference.

The cathode active layers may further comprise one or more conductive fillers to provide enhanced electronic conductivity, for example, as described in U.S. Pat. No. 6,194,099 to Geronov et al. and U.S. Pat. No. 6,210,831 to Gorkovenko et al., the disclosures of which that describe sulfur-containing cathodes are incorporated herein by reference. The cathode active layers may also comprise a binder. The choice of binder material may vary widely. Useful binders are those materials, usually polymeric, that allow for ease of processing of battery electrode composites and are known to those skilled in the art of electrode fabrication.

The cathode active layers may further comprise one or more N—O additive of the present invention.

Separator

The electrochemical cells of the present invention may further comprise a separator interposed between the cathode and anode, although a separator is optional. Typically, the separator is a porous non-conductive or insulative material which separates or insulates the anode and the cathode from each other and which permits the transport of ions through the separator between the anode and the cathode.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in U.S. Pat. No. 6,153,337, by Carlson et al., the disclosure of which related to the structure of separators and separator materials is incorporated herein by reference. The additive of the present invention may be added to the separator during cell assembly or incorporated in a coating process. Separators of a wide range of thickness may be used, for example from about 5 μm to about 50 μm, preferably from about 5 μm to about 25 μm.

Nonaqueous Electrolyte

The electrolytes used in electrochemical cells function as a medium for the storage and transport of ions, and in the case of solid electrolytes and gel electrolytes, these materials may additionally function as separator materials between the anode and the cathode. Any liquid, solid, or gel material capable of storing and transporting ions may be used as an electrolyte in the invention, so long as the material is substantially electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more nonaqueous liquid electrolyte solvents, gel polymer materials, or solid polymer materials. Suitable nonaqueous electrolytes for use in the present invention include, but are not limited to, organic electrolytes comprising one or more materials selected from the group consisting of liquid electrolytes, gel polymer electrolytes, and solid polymer electrolytes. Examples of nonaqueous electrolytes for lithium batteries are described by Dominey in *Lithium Batteries, New Materials, Developments and Perspectives*, Chapter 4, pp. 137-165, Elsevier, Amsterdam (1994) and examples of gel polymer electrolytes and solid polymer electrolytes are described by Alamgir et al. in *Lithium Batteries, New Materials, Developments and Perspectives*, Chapter 3, pp. 93-136, Elsevier, Amsterdam (1994), the respective disclosures of which are incorporated herein by reference.

Organic solvents for use in a nonaqueous electrolyte according to the invention include, but are not limited to, families such as, acetals, ketals, sulfones, acyclic ethers, cyclic ethers, glymes, polyethers, dioxolanes, substituted forms of the foregoing, and blends thereof.

Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane.

Examples of cyclic ethers that may be used include, but are not limited to, tetrahydrofuran, tetrahydropyran, 2-methyltetrahydrofuran, 1,4-dioxane, 1,3-dioxolane, and trioxane.

Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers.

Examples of sulfones that may be used include, but are not limited to, sulfolane, 3-methyl sulfolane, and 3-sulfolene.

The specific choice of solvent for a particular cell will depend on one or more of several factors, including the composition of the anode and cathode, and the solubility of the lithium salts of the anions generated during discharge of the electroactive sulfur-containing material of the cathode. Although a single solvent may be used, a solvent mixture comprising two or more solvents selected from acyclic ethers, glymes and related polyethers, and cyclic ethers, such as 1,3-dioxolane is preferred. Preferred mixtures of solvents include, but are not limited to, 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the preferred binary mixtures may vary from about 5 to 95 to 95 to 5. Preferred are mixtures comprising dioxolane. Most preferred are mixtures comprising greater than 40% by weight of dioxolane.

Ionic electrolyte lithium salts may be added to the electrolyte to increase the ionic conductivity. Examples of ionic electrolyte lithium salts for use in the present invention include, but are not limited to one or more of, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Preferred ionic electrolyte lithium salts are LiSCN, LiSO$_3$CF$_3$, and LiN(SO$_2$CF$_3$)$_2$. A range of concentrations of the ionic lithium salts in the solvent may be used such as from about 0.2 m to about 2.0 m (m is moles/kg of solvent). Preferred concentrations are from about 0.5 m to about 1.5 m. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary.

Furthermore, if the ionic N—O additive of the present invention is, for example, inorganic nitrate, organic nitrate, or inorganic nitrite it may provide ionic conductivity to the electrolyte in which case no additional ionic lithium electrolyte salts may be needed.

Additive

N—O compounds for use as additives in the electrolyte of the present invention include, but are not limited to, families such as inorganic nitrates, organic nitrates, inorganic nitrites, organic nitrites, organic nitro compounds, and other organic N—O compounds.

Examples of inorganic nitrates that may be used include, but are not limited to, lithium nitrate, potassium nitrate, cesium nitrate, barium nitrate, and ammonium nitrate.

Examples of organic nitrates that may be used include, but are not limited to, dialkyl imidazolium nitrates, and guanidine nitrate.

Examples of inorganic nitrites that may be used include, but are not limited to, lithium nitrite, potassium nitrite, cesium nitrite, and ammonium nitrite.

Examples of organic nitrites that may be used include, but are not limited to, ethyl nitrite, propyl nitrite, butyl nitrite, pentyl nitrite, and octyl nitrite.

Examples organic nitro compounds that may be used include, but are not limited to, nitromethane, nitropropane, nitrobutanes, nitrobenzene, dinitrobenzene, nitrotoluene, dinitrotoluene, nitropyridine, and dinitropyridine.

Examples of other organic N—O compounds that may be used include, but are not limited to, pyridine N-oxide, alkylpyridine N-oxides, and tetramethyl piperidine N-oxyl (TEMPO).

Concentrations of the N—O additive in the electrolytes are from about 0.02 m to about 2.0 m. Preferred concentrations are from about 0.1 m to about 1.5 m. The most preferred concentrations are from 0.2 m to 1.0 m. Concentrations of the ionic N—O additive when used in embodiments that do not include added lithium salts may vary from about 0.2 m to about 2.0 m.

Although it is preferred to incorporate the N—O additive into the electrolyte that is added to the lithium/sulfur cells during fabrication, the N—O additive may first be introduced into the cell as a part of other cell components from where it can enter the electrolyte. The N—O additive may be incorporated into liquid, gel or solid polymer electrolytes. The N—O additive may be incorporated in the cathode formulation or into the separator in the fabrication process, as long as it is included in a manner such that it will enter the electrolyte in sufficient concentrations. Thus during discharge and charge of the cell the N—O additive incorporated in the cathode formulation or the separator would dissolve in the electrolyte.

Utilization

As used herein, "utilization" assumes that if all elemental sulfur in an electrode is fully utilized, the electrode will produce 1675 mAh/g of sulfur. That is, 100% utilization corresponds to 1675 mAh/g of the sulfur in the cell, 90% utilization corresponds to 1507.5 mAh/g, 60% utilization corresponds to 1005 mAh/g, and 50% utilization corresponds to 837.5 mAh/g of sulfur in the cell.

Sulfur utilization varies with the discharge current applied to the cell, among other things. Sulfur utilization at low discharge rates is higher than at high discharge rates, for example, as described for primary cells in U.S. Pat. No. 4,410,609 to Peled et al. and as described for secondary cells in U.S. Pat. No. 6,030,720 to Chu et al. and by Cheon et al. in *J. Electrochem. Soc.*, 2003, vol. 150, pp. A800-A805.

Typically, secondary cells of this invention will cycle at least 10 times, preferably at least 20 times and more preferably at least 50 times, with each cycle having a sulfur utilization (measured as a fraction of 1675 mAh/g sulfur output during the discharge phase of the cycle) of at least about 60% when discharged at a moderately high discharge current of 340 mA/g of sulfur (0.41 mA/cm$^2$ for the 846 cm$^2$ cells of the Examples). This discharge rate results in a preferred discharge period of less than 4 hours for the cells of the present invention, such as for example, the cells of Examples 2-12. As illustrated in Example 27 and Table 4 cells of the present invention deliver sulfur utilization in excess of 65% at very high discharge currents up to 3600 mA (3495 mA/g) (equivalent to 4.26 mA/cm$^2$). At this discharge current these cells are fully discharged in less than 20 minutes (a 3C rate).

The additive of the present invention increases utilization by about 20% or more in the tests set forth in the Examples. Typically the increase in utilization is from about 20% to more than 35% dependent upon discharge rate, N—O additive composition, and N—O additive concentration. For example, the discharge capacity at the 5$^{th}$ cycle of the cells of Example 2 show an increase in utilization of 36% compared with the cells of Comparative Example 1 (1226 mAh/g vs. 901 mAh/g). The cells of Example 9, Example 13, and Example 19 show increases in utilization of 24%, 23%, and 32%, respectively, compared with the cells of Comparative Example 1.

The additive of the present invention enhances sulfur utilization over a range of additive concentrations. Although low concentrations, for example less than 0.1 m, can be used, enhanced sulfur utilization may only be obtained for a limited number of cycles at low concentrations.

Self-Discharge

It is highly desirable that batteries retain their capacity during prolonged storage under ambient conditions. However, battery storage typically leads to a loss of charge retention, often termed self-discharge. "Self-discharge," as used herein, pertains to the difference between the discharge capacity of a cell at the N$^{th}$ cycle and the discharge capacity at the (N+1)$^{th}$ cycle after a storage period in a charged state:

$$\text{Self-discharge}(\%) = \frac{C^N - C^{N+1}}{C^N} \times 100\%,$$

where $C^N$ is the N$^{th}$ cycle discharge capacity of the cell (mAh) and $C^{N+1}$ is the (N+1)$^{th}$ cycle discharge capacity of the cell (mAh) after a storage period.

Factors that influence charge retention, as summarized by Linden, in *Handbook of Batteries, 2$^{nd}$ Edition*, pp. 3.18-3.19, McGraw Hill, New York, 1995, include, for example, storage conditions such as temperature, length of storage, cell design, the electrochemical system, and discharge conditions.

One approach to reducing self-discharge during storage in Li/S cells is described in U.S. Pat. No. 6,436,583 to Mikhaylik in which the electrolyte comprises one or more organic sulfites. The self-discharge inhibiting organic sulfites are particularly effective in fresh cells but may be removed by reaction with polysulfides produced during cell discharge.

As summarized in Table 1, self-discharge of the examples set forth herein was determined by comparing discharge capacity at the 5$^{th}$ discharge cycle (2 min after charge) with capacity at the 6$^{th}$ discharge cycle measured after storage in the fully charged state for 24 hours at approximately 25° C. For the cells of Comparative Example 1 without additive the self-discharge is (901−775)/901×100%=14%. For the cells of Example 4 the self-discharge is (1155−1109)/1155×100%=4%. For the cells of Example 13 the self-discharge is (1107−1023)/1107×100%=7.6%. Further, it can be seen from Table 1 that as a result of the lowered self-discharge due to inclusion of an N—O additive, sulfur utilization remained high after the cells of the present invention were stored. After storage, cells of Examples 4, 5, 6, and 8 showed a sulfur utilization of at least 60% whereas the cells of Comparative Example 1 showed sulfur utilization of only 46%.

Figure 1:
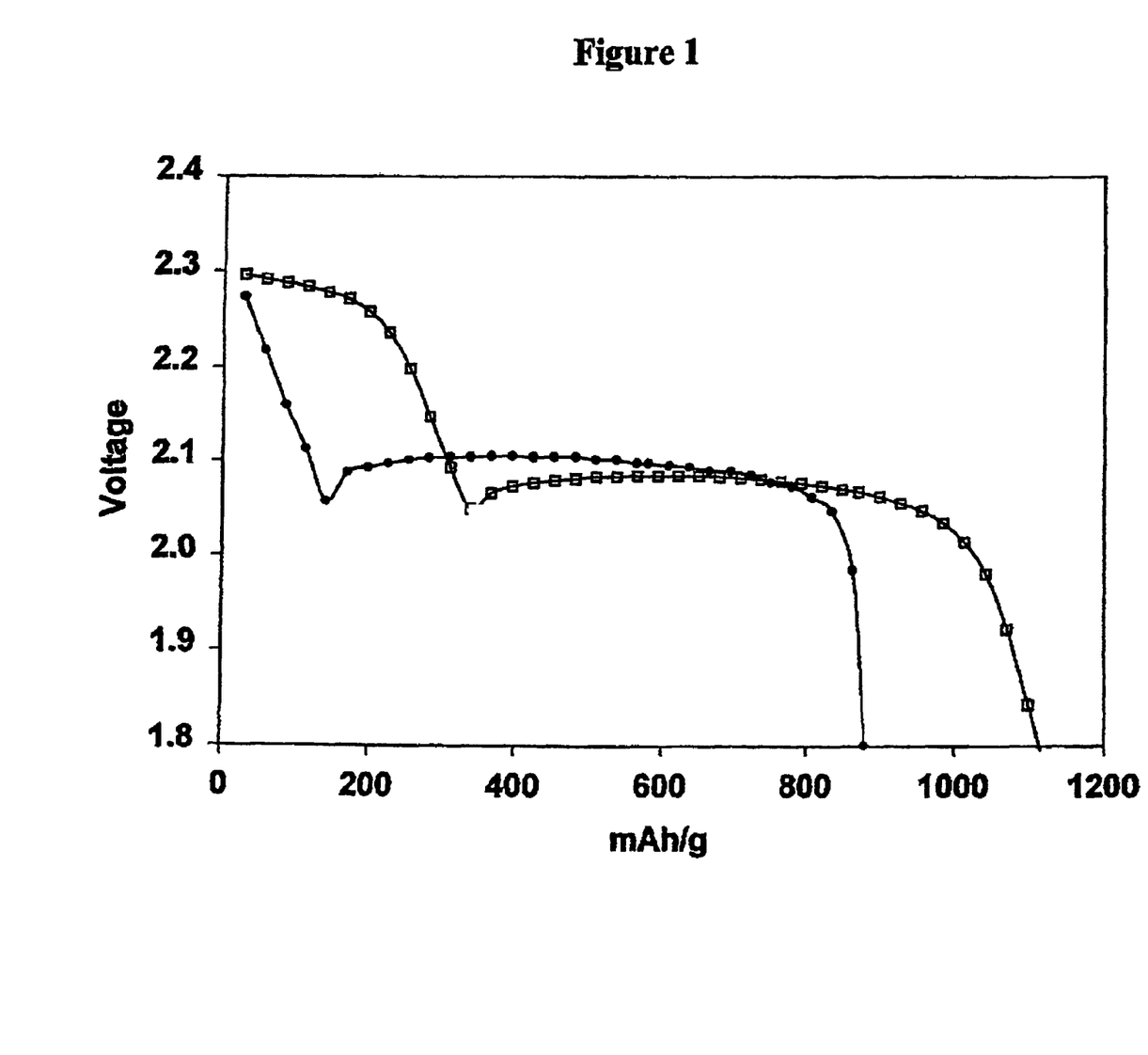
FIG. 1 illustrates the discharge of a cell of Example 4 (□) versus a cell of Comparative Example 1 (no additive) (●).
Figure 2:
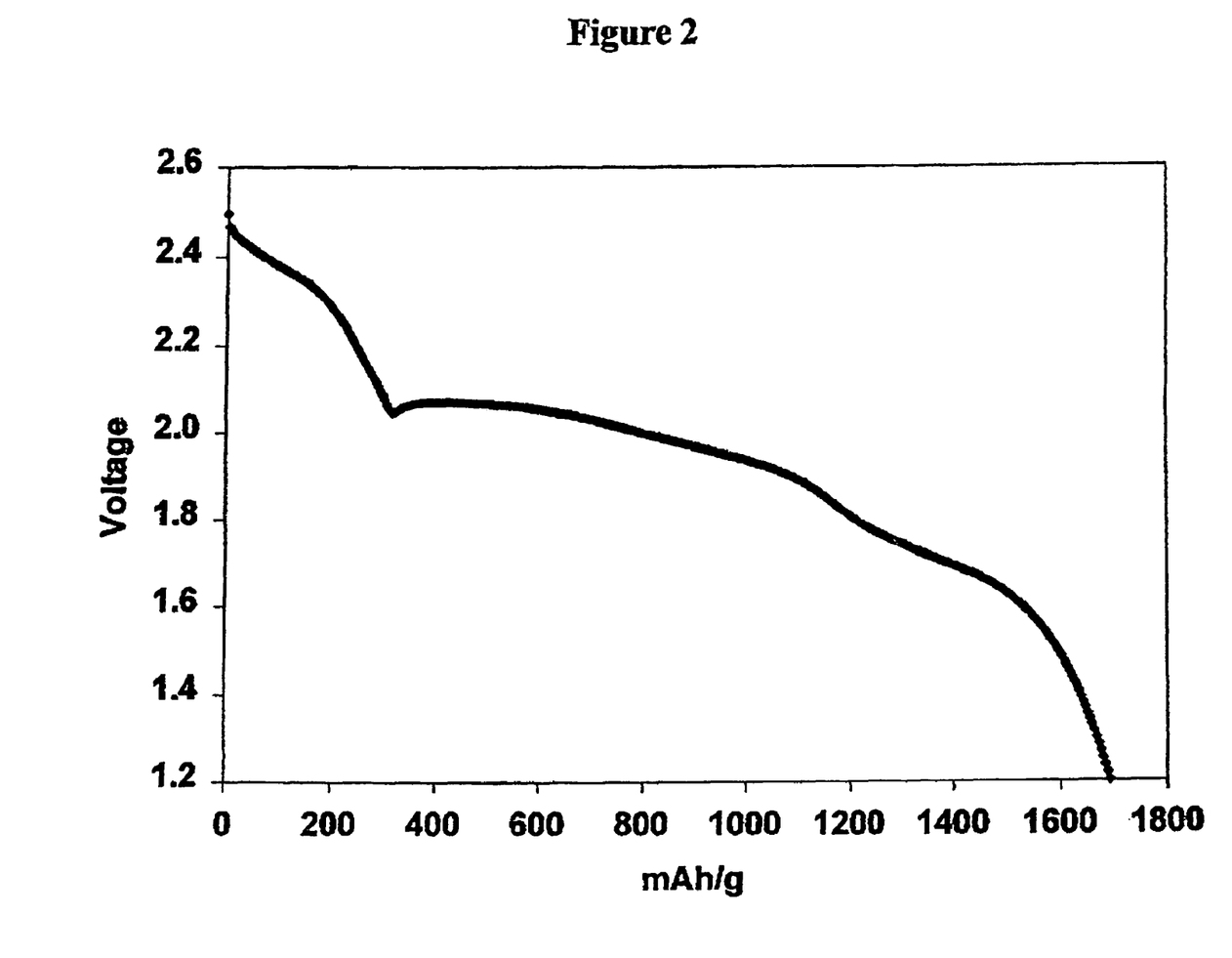
FIG. 2 illustrates discharge of the cell of Example 24, that shows 100% sulfur utilization.
Figure 3:
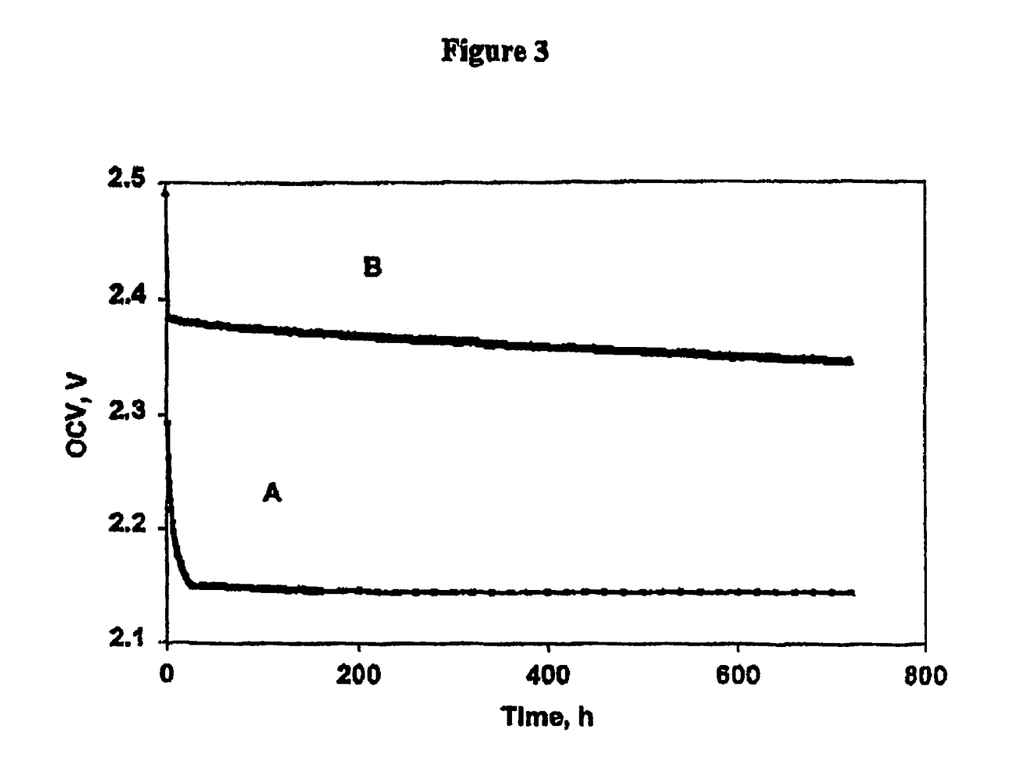
FIG. 3 illustrates the open cell voltage (OCV) for a cell with additive LiNO$_3$ (B) (Example 16) and without additive (A).

Self discharge can also be monitored by measuring open cell voltage (OCV) of the fully charged cell during storage. OCV declines as capacity is lost due to self discharge. As illustrated in FIG. 3 cells of Example 16 of the present invention show little change in OCV upon storage for 30 days in the fully charged condition when stored after 34 discharge-charge cycles, which indicates a very low rate of self-discharge. As also illustrated in FIG. 3, cells without the additive of the present invention show a rapid change in OCV in less than 20 hours when stored under the same conditions, which indicates a high rate of self-discharge.

Charge-Discharge Efficiency

Figure 4:
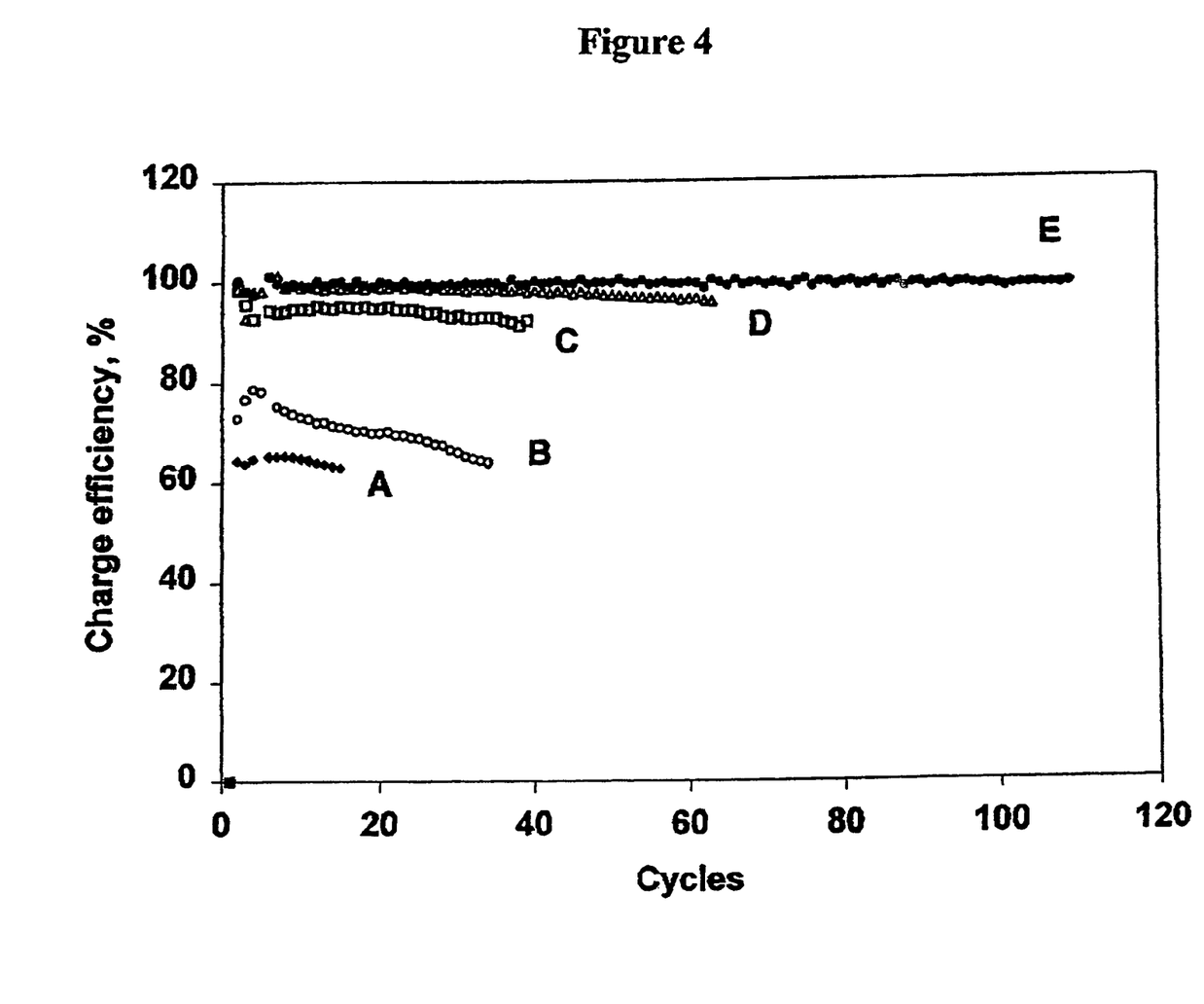
FIG. 4 illustrates charge-discharge efficiency vs. cycle number: A for a cell of Comparative Example 1 (no additive); B for a cell of Example 1; C for a cell of Example 12; D for a cell of Example 4; and E for a cell of Example 5.

The term "charge-discharge efficiency" as used herein, represents the ratio of capacity obtained on discharge divided by the capacity supplied in the prior charge step. In other words, charge-discharge efficiency, $C_{eff}=D_{n+1}/C_n\times 100\%$, where D is discharge capacity, C is charge capacity and n is the cycle number. The additive of the present invention increases the charge-discharge efficiency of Li/S cells. For example, the cells of Example 4 in which the additive is lithium nitrate (LiNO$_3$) show a charge-discharge efficiency of 98.8% whereas the cells of Comparative Example 1 without additive show a charge-discharge efficiency of only 66.3%, as shown in Table 1 (both measured at the 4$^{th}$ charge cycle and the 5$^{th}$ discharge cycle). The high charge-discharge efficiency is maintained during further cycling as illustrated in FIG. 4.

While not being bound by any specific theory, it is believed that the superior charge-discharge efficiency results are achieved for, among other things, the following reasons. In Li/S cells during the charging process sulfide ions or low chain polysulfides are oxidized at the cathode to higher polysulfides, which are soluble in the electrolyte. These higher polysulfides diffuse to the anode where they are reduced to lower polysulfides, which in turn diffuse back to the cathode to be reoxidized. This redox shuttle causes a continuous current flow in the cell, resulting in a reduction of the cell's storage capacity and a lowered charge-discharge efficiency. A similar redox process occurs during self-discharge. The additive of the present invention, it is believed, essentially inactivates the shuttle in Li/S cells, which results in much higher charge-discharge efficiencies.

Charge Termination by Voltage

Figure 5:
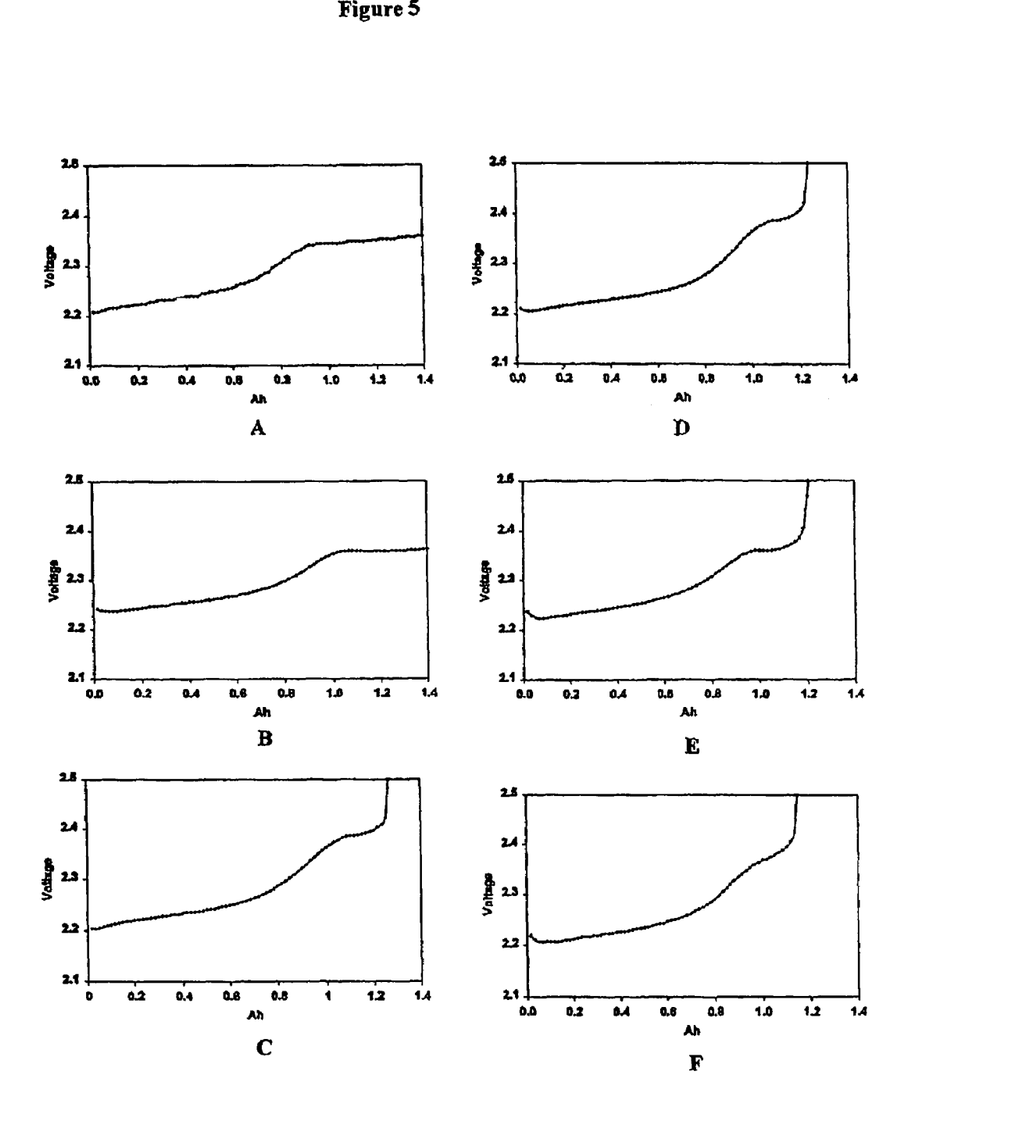
FIG. 5 illustrates the charge profile at the $5^{th}$ charge cycle: A for a cell of Comparative Example 1 (no additive); B for a cell of Example 1 (0.002 m $LiNO_3$); C for a cell of Example 2 (0.1 m $LiNO_3$); D for a cell of Example 3 (0.2 m $LiNO_3$); E for a cell of Example 4 (0.4 m $LiNO_3$); and F for a cell of Example 5 (1.55 m $LiNO_3$).

In the charging process of rechargeable cells it is important to be able determine when the cell is fully charged because overcharging is damaging to a cell as well as time wasting. Cells may show a sharp changes in temperature or voltage at the point of reaching full charge. For example, at the end of charge lithium ion cells show a sharp increase in voltage, as described, by Golovin et al. in *J. Electrochem. Soc.*, 1992, vol. 139, pp. 5-10. In contrast, as illustrated in FIG. 5A, the Li/S cells of Comparative Example 1, lacking the N—O additive, exhibit a voltage profile which reaches a plateau at about 2.3 volts and does not increase with prolonged charging. This curve resembles the shape of the voltage curve for a lithium ion cell under charge to which has been added a redox shuttle additive, for example, as described by Golovin et al. As illustrated in FIG. 5C-F the cells of the present invention (Examples 2, 3, 4, and 5) comprising N—O additive exhibit a voltage profile upon charge at constant current that shows a sharp increase in voltage as the cell reaches full capacity. The rapid increase in voltage as the cell reaches full capacity in the cells of the present invention comprising N—O additive may be used to terminate the charging process. For example, at a predetermined voltage within this region of rapid increase in voltage the charging process can be terminated.

In one method of the present invention, a Li/S cell is charged by (a) supplying electric energy at constant current; (b) monitoring voltage during the charging; and (c) terminating the charge when the monitored voltage is in the range of about 2.35 volts to about 2.7 volts. In one embodiment of the method, the charge is terminated in the range of about 2.4 volts to about 2.6 volts. In a further embodiment of the method, the charge is terminated at a voltage of about 2.5 volts. Typically charging is performed by supplying constant current so as to charge the cell in about 1 to 6 hours. For the cells of the Examples the currents are from about 200 mA to about 1200 mA, or about 0.24 mA/cm$^2$ to about 1.44 mA/cm$^2$. The supply of constant current is typically provided with an accuracy in the range of 1-5%; i.e. the current may vary ±1-5%. Voltage is typically monitored in the monitoring step at intervals varying from about 10 seconds to less than 1 second, depending among other things, for example, on the magnitude of the current and the length of charge. In an alternative charge termination method, a cell is charged at constant current to a predetermined voltage; charging continued at this voltage until the charge current density falls to a value in the range of about 0.025 mA/cm$^2$ to about 0.01 mA/cm$^2$. In one method of the present invention, a Li/S cell is charged by (a) supplying electric energy at constant current; (b) monitoring voltage during the charging; (c) supplying electric energy at constant current until the monitored voltage is about 2.5 volts; (d) holding the cell voltage at about 2.5 volts while monitoring the charge current density; and (e) terminating the charge when the charge current density becomes less than 0.025 mA/cm$^2$. In another embodiment of the method, the charge is terminated at a current density of less than 0.012 mA/cm$^2$. A current density of 0.025 mA/cm$^2$ is equivalent to a current of 21 mA/g of sulfur and a current density 0.012 mA/cm$^2$ is equivalent to a current of 10 mA/g of sulfur in the cells of the Examples.

Although the use of voltage to determine the charge cutoff is preferred for charge termination, a delta voltage/delta time (dV/dt) may also be used. For example, as the charging proceeds dV/dt rapidly increases at full charge, and this point of rapid increase can used with appropriate electronics for charge termination. As illustrated in Example 28 the magnitude of dV/dt increases by a factor more than 8 at about 2.5 V and by a further order of magnitude above 2.5 V. In another method of the present invention, a Li/S cell is charged by (a) supplying electric energy at constant current; (b) monitoring voltage during the charging; (c) calculating the rate of change of voltage with time (dV/dt); and (d) terminating the charge when the value of dV/dt increases by more than 5 times. In another embodiment the charge is terminated when the value of dV/dt increases by more than 10 times. With the flat voltage profile of Li/S cells lacking the N—O additive, overcharge of the cells invariably occurs and, furthermore, more complex charge termination methods are required which may be less reliable, less efficient, much less precise, may damage the cells, and be more costly.

The additive of the present invention is effective in providing a charge profile with a sharp increase in voltage at the point of full charge over a range of concentrations from about 0.1 m to about 2.0 m. In one embodiment, the concentration of the additive of the present invention is from about 0.1 m to about 1.0 m. In a preferred embodiment, the concentration of the additive of the present invention is from 0.1 m to 0.5 m. Although low concentrations, for example less than 0.1 m, can be used, a charge profile with a sharp increase in voltage at the point of full charge may only be obtained for a limited number of cycles with low concentrations.

While not being bound by any specific theory, it is believed that the additive of the present invention essentially inactivates (turns off) the shuttle in Li/S cells, which eliminates the flat voltage charge profile of Li/S cells without the additive, and substitutes a sharp voltage increase at the point of full charge.

Cells and Batteries

Cells of the present invention may be made in a variety of sizes and configurations in any suitable fashion which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight thin film barrier materials are particularly preferred, e.g., foils. For example, U.S. Pat. No. 6,190,426 to Thibault et al. describes methods for preparing prismatic cells in which suitable barrier materials for sealed casing, methods of filling cells with electrolyte, and methods of sealing the casing, are described, the disclosure of which is incorporated herein by reference. When using thin film electrodes configured into prismatic designs it is important that the electrodes possess dimensional stability.

Batteries may be of any size or shape and may comprise one or more cells according to the invention. For example, one or more of the prismatic cells described in U.S. Pat. No. 6,190,426 to Thibault et al. may be connected to form a battery. Batteries comprising one or more cells may be encased in a rigid casing, for example, as described in U.S. Pat. No. 6,296,967 to Jacobs et al.

EXAMPLES

Several embodiments of the present invention are described in the following examples, which are offered by way of illustration and not by way of limitation.

In the following Examples and Comparative Examples cells were prepared by the following method. The cathodes were prepared by coating a mixture of 73 parts by weight of elemental sulfur, 22 parts by weight of conductive carbon, and 5 parts by weight of a polyethylene powder, dispersed in isopropanol, onto a 6 micron thick conductive carbon coated aluminum/polyester (PET) film substrate. After drying, the coated cathode active layer thickness was about 28-29 microns. The anode was lithium foil of about 50 microns in thickness. The porous separator used was a 9 micron polyolefin separator. The above components were assembled in a layered structure of cathode/separator/anode, which was wound and compressed, and placed in a foil pouch with liquid electrolyte (approximately 4.7 g). The prismatic cell had an electrode area of about 846 $cm^2$. The sulfur content of the cell was 1.03 g, equivalent to 1725 mAh capacity (1675 mAh/g×1.03 g). After sealing the cell in a foil pouch, it was stored for 24 hours and then re-sealed. Discharge-charge cycling of the cell was performed at 350 mA/200 mA, respectively, with discharge cutoff at a voltage of 1.8 V and charge cutoff at 2.5 V (or for 7 hrs if that was reached first). The discharge rate of 350 mA is 0.414 mA/$cm^2$ for this cell (350 mA/846 $cm^2$) and the charge rate of 200 mA is 0.236 mA/$cm^2$ (200 mA/846 $cm^2$). The pause after each charge and discharge step was 2 minutes, unless otherwise noted. The temperature for the cell evaluation was between 22° C. and 25° C. The following Examples and Comparative Examples describe the electrolytes evaluated in these Li/S cells.

Comparative Example 1

The electrolyte was a 0.5 m solution of lithium bis (trifluoromethylsulfonyl) imide, (lithium imide) in a 50:50 weight ratio mixture of 1,3-dioxolane (DOL) and dimethoxyethane (DME). The discharge capacity at the $5^{th}$ cycle was 928 mAh and specific capacity 901 mAh/g. After the subsequent charge cycle ($5^{th}$ charge cycle) the cell was allowed to rest for 24 hours at ambient temperature (25° C.) before discharge ($6^{th}$ discharge cycle). The discharge capacity at the $6^{th}$ cycle was 799 mAh and the specific capacity was 775 mAh/g of sulfur. Charge and discharge steps were resumed with the normal 2 minute pause after each. The discharge capacity at the $7^{th}$ cycle was 933 mAh and the specific capacity was 906 mAh/g of sulfur. Charge-discharge cycles were continued until the discharge capacity diminished to 900 mAh (874 mAh/g of sulfur; 52% utilization), which was 15 cycles and the accumulated capacity 14.1 Ah.

Example 1

The electrolyte was that of Comparative Example 1 except that lithium nitrate at a concentration of 0.002 m was incorporated in the 0.5 m electrolyte solution of lithium imide in a 50/50 mixture of DOL and DME. In other words 0.002 moles of lithium nitrate (0.14 g) was added per Kg of the DOL/DME solvent (0.14 mg/g of solvent). Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 34 cycles and the accumulated capacity 33.7 Ah. 9 cycles were achieved before utilization fell below 60% (1005 mAh/g of sulfur).

Example 2

The electrolyte was that of Comparative Example 1 except that lithium nitrate at a concentration of 0.1 m (6.9 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur), which was 33 cycles and the accumulated capacity 37.1 Ah. 25 cycles were achieved before utilization fell below 60% (1005 mAh/g of sulfur).

Example 3

The electrolyte was that of Comparative Example 1 except that lithium nitrate at a concentration of 0.2 m (13.8 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 46 cycles and the accumulated capacity 51.6 Ah. 39 cycles were achieved before utilization fell below 60% (1005 mAh/g of sulfur).

Example 4

The electrolyte was that of Comparative Example 1 except that lithium nitrate at a concentration of 0.4 m (27.6 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 63 cycles and the accumulated capacity 69.2 Ah. 50 cycles were achieved before utilization fell below 60% (1005 mAh/g of sulfur).

Example 5

The electrolyte was that of Comparative Example 1 except that lithium nitrate at a concentration of 1.55 m (107 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 102 cycles and the accumulated capacity 105.8 Ah. 70 cycles were achieved before utilization fell below 60% (1005 mAh/g of sulfur).

Example 6

The electrolyte was that of Comparative Example 1 except that the electrolyte was made by the incorporation of lithium nitrate at a concentration of 0.4 m (27.6 mg/g of solvent) in a 0.5 m solution of lithium trifluoromethyl sulfonate (lithium triflate) in a 50:50 weight ratio mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 54 cycles and the accumulated capacity 56.6 Ah. 35 cycles were achieved before utilization fell below 60% (1005 mAh/g of sulfur).

Example 7

The electrolyte was that of Comparative Example 1 except that potassium nitrate at a concentration of approximately 0.1 m (10 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 28 cycles and the accumulated capacity 30.3 Ah. 26 cycles were achieved before utilization fell below 60% (1005 mAh/g of sulfur).

Example 8

The electrolyte was that of Comparative Example 1 except that cesium nitrate at a concentration of approximately 0.1 m (19 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 23 cycles and the accumulated capacity 24.8 Ah. 22 cycles were achieved before utilization fell below 60% (1005 mAh/g of sulfur).

Example 9

The electrolyte was that of Comparative Example 1 except that ammonium nitrate at a concentration of 0.013 m (1 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 44 cycles and the accumulated capacity 45.3 Ah. 19 cycles were achieved before utilization fell below 60% (1005 mAh/g of sulfur).

Example 10

The electrolyte was that of Comparative Example 1 except that guanidinium nitrate at a concentration of 0.02 m (2.4 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 36 cycles and the accumulated capacity 35.5 Ah. 10 cycles were achieved before utilization fell below 60% (1005 mAh/g of sulfur).

Example 11

The electrolyte was that of Comparative Example 1 except that potassium nitrite ($KNO_2$) at a concentration of approximately 0.1 m (8 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 17 cycles and the accumulated capacity 18.1 Ah. 16 cycles were achieved before utilization fell below 60% (1005 mAh/g of sulfur).

Example 12

The electrolyte was that of Comparative Example 1 except that 3,4-dinitro-toluene at a concentration of 0.4 m (73 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 39 cycles and the accumulated capacity 38.8 Ah. 13 cycles were achieved before utilization fell below 60% (1005 mAh/g of sulfur).

Example 13

The electrolyte was that of Comparative Example 1 except that nitromethane at a concentration of 0.4 m (24 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 39 cycles and the accumulated capacity 41.6 Ah. 28 cycles were achieved before utilization fell below 60% (1005 mAh/g of sulfur).

Example 14

The electrolyte was that of Comparative Example 1 except that nitromethane at a concentration of 0.02 m (1.2 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 23 cycles and the accumulated capacity 22.2 Ah. 1 cycle was achieved before utilization fell below 60% (1005 mAh/g of sulfur).

Example 15

The electrolyte was that of Comparative Example 1 except that lithium nitrate at a concentration of 0.5 m was incorporated in a DOL/DME mixture (50/50 by weight) as the electrolyte solution, without lithium imide. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 71 cycles and the accumulated capacity 76.1 Ah. 47 cycles were achieved before utilization fell below 60% (1005 mAh/g of sulfur).

Example 16

The electrolyte was that of Comparative Example 1 except that lithium nitrate at a concentration of 1.24 m was incorporated in a 0.77 m electrolyte solution of lithium imide in a 50/50 mixture of DOL and DME. Cycling of the cell was performed by the procedure of Comparative Example 1 for fifteen discharge and charge cycles. After the 15$^{th}$ charge cycle the cell was stored at 25° C. for 8 days before the 16$^{th}$ discharge cycle. The discharge capacity at the 15$^{th}$ cycle was 1249 mAh (specific capacity 1213 mAh/g of sulfur) and the discharge capacity at the 16$^{th}$ cycle was 1195 mAh (specific capacity 1160 mAh/g of sulfur). Sulfur utilization at the 15$^{th}$ cycle was 72.4% and at the 16$^{th}$ cycle 69.3%. Self discharge during 8 days storage was (1249−1195)/1249×100%=4.3%. Cycling was resumed and after the 34$^{th}$ charge cycle the cell was stored for 30 days. FIG. 3 shows the open cell voltage during the 30 day storage period, showing very small voltage change.

Example 17

The electrolyte was that of Comparative Example 1 except that 1-nitropropane at a concentration of 0.4 m (35.6 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 30 cycles and the accumulated capacity 30.2 Ah. 17 cycles were achieved before utilization fell below 60% (1005 mAh/g of sulfur).

Example 18

The electrolyte was that of Comparative Example 1 except that TEMPO (tetramethyl piperidine N-oxyl) at a concentration of 0.09 m (14.0 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 19 cycles and the accumulated capacity 17.8 Ah.

Example 19

The electrolyte was that of Comparative Example 1 except that 1-ethyl-3-methylimidazolium nitrate at a concentration of 0.12 m (20.8 mg/g of solvent) was incorporated in the 0.5 m electrolyte solution of lithium imide in a 50/50 mixture of DOL and DME. Cycling of the cell was performed by the procedure of Comparative Example 1 with the results shown in Tables 2 and 3. Charge-discharge cycles were continued until the discharge capacity diminished to 900 mAh (874 mAh/g of sulfur; 52% utilization), which was 26 cycles and the accumulated capacity 29.4 Ah. 25 cycles were achieved before utilization fell below 60% (1005 mAh/g of sulfur).

TABLE 1

Sulfur Utilization and Specific Capacity

| Example | Additive (Concentration molal, m) | Specific Capacity mAh/g (Sulfur Utilization) | | |
|---|---|---|---|---|
| | | 5$^{th}$ Cycle | 6$^{th}$ Cycle* | 7$^{th}$ Cycle |
| Comp. Ex. 1 | None | 901 (54%) | 75 (46%) | 906 (54%) |
| Example 1 | LiNO$_3$ (0.002 m) | 1065 (64%) | 848 (51%) | 1021 (61%) |
| Example 2 | LiNO$_3$ (0.1 m) | 1226 (73%) | 934 (56%) | 1215 (73%) |
| Example 3 | LiNO$_3$ (0.2 m) | 1196 (71%) | 1015 (61%) | 1200 (72%) |
| Example 4 | LiNO$_3$ (0.4 m) | 1155 (68%) | 1109 (66%) | 1158 (69%) |
| Example 5 | LiNO$_3$ (1.55 m) | 1106 (66%) | 1035 (62%) | 1102 (66%) |
| Example 6 | LiNO$_3$ (0.4 m) | 1129 (67%) | 1002 (60%) | 1077 (64%) |
| Example 7 | KNO$_3$ (<0.1 m) | 1098 (66%) | 847 (51%) | 1094 (65%) |
| Example 8 | CsNO$_3$ (<0.1 m) | 1084 (65%) | 824 (49%) | 1089 (65%) |
| Example 9 | NH$_4$NO$_3$ (0.013 m) | 1117 (67%) | 907 (54%) | 1122 (67%) |
| Example 10 | Guanidine nitrate (0.02 m) | 1026 (61%) | 870 (52%) | 1009 (60%) |
| Example 11 | KNO$_2$ (<0.1 m) | 1067 (64%) | 833 (50%) | 1073 (64%) |
| Example 12 | 3,4-dinitro-toluene (0.4 m) | 1051 (63%) | 846 (51%) | 1026 (61%) |
| Example 13 | Nitromethane (0.4 m) | 1107 (66%) | 1023 (61%) | 1128 (67%) |
| Example 14 | Nitromethane (0.02 m) | 996 (59%) | 855 (51%) | 992 (59%) |
| Example 15 | LiNO$_3$ (0.4 m) | 1065 (64%) | 968 (58%) | 1106 (66%) |
| Example 17 | 1-nitropropane (0.4 m) | 1053 (63%) | 949 (57%) | 1052 (63%) |
| Example 18 | TEMPO (0.09 m) | 919 (55%) | 793 (47%) | 907 (54%) |
| Example 19 | 1-ethyl-3-methyl imidazolium nitrate (0.12 m) | 1186 (71%) | 904 (54%) | 1171 (70%) |

Cells were stored for 24 hours at 25° C. before the 6$^{th}$ discharge cycle.

TABLE 2

Charge-Discharge Efficiency

| Example | Additive (Concentration, molal, m) | Charge (mAh) | Discharge (mAh) | D$_5$/C$_4$ |
|---|---|---|---|---|
| Comp. Ex. 1 | None | 1400 | 928 | 66.3% |
| Example 1 | LiNO$_3$ (0.002 m) | 1393 | 1097 | 78.8% |
| Example 2 | LiNO$_3$ (0.1 m) | 1345 | 1263 | 93.9% |
| Example 3 | LiNO$_3$ (0.2 m) | 1282 | 1232 | 96.1% |
| Example 4 | LiNO$_3$ (0.4 m) | 1204 | 1189 | 98.8% |
| Example 5 | LiNO$_3$ (1.55 m) | 1168 | 1139 | 97.6% |
| Example 6 | LiNO$_3$ (0.4 m) | 1200 | 1163 | 96.9% |

TABLE 2-continued

Charge-Discharge Efficiency

| Example | Additive (Concentration, molal, m) | Charge (mAh) | Discharge (mAh) | $D_5/C_4$ |
|---|---|---|---|---|
| Example 7 | $KNO_3$ (<0.1 m) | 1242 | 1131 | 91.0% |
| Example 8 | $CsNO_3$ (<0.1 m) | 1276 | 1117 | 87.5% |
| Example 9 | $NH_4NO_3$ (0.013 m) | 1386 | 1150 | 83.0% |
| Example 10 | Guanidine nitrate (0.02 m) | 1400 | 1057 | 75.5% |
| Example 11 | $KNO_2$ (<0.1 m) | 1273 | 1099 | 86.3% |
| Example 12 | 3,4-dinitro-toluene (0.4 m) | 1163 | 1083 | 93.1% |
| Example 13 | Nitromethane (0.4 m) | 1226 | 1140 | 93.0% |
| Example 14 | Nitromethane (0.02 m) | 1400 | 1026 | 73.3% |
| Example 15 | $LiNO_3$ (0.4 m) | 1150 | 1097 | 95.4% |
| Example 17 | 1-nitropropane (0.4 m) | 1156 | 1085 | 93.9% |
| Example 18 | TEMPO (0.09 m) | 1400 | 947 | 67.6% |
| Example 19 | 1-ethyl-3-methyl imidazolium nitrate (0.12 m) | 1296 | 1222 | 94.3% |

Comparative Example 2

The electrolyte was that of Comparative Example 1 except that lithium thiocyanate (LiSCN) at a concentration of 0.25 m was incorporated in a 0.5 m electrolyte solution of lithium imide in DOL. Cycling of the cell was performed by the procedure of Comparative Example 1 with the results shown in Table 3. Charge-discharge cycles were continued until the discharge capacity diminished to 900 mAh (874 mAh/g of sulfur; 52% utilization), which was 18 cycles and the accumulated capacity 17.4 Ah.

Example 20

The electrolyte was that of Comparative Example 2 except that lithium nitrate at a concentration of 0.25 m (17.3 mg/g of solvent) was incorporated in the electrolyte solution. Cycling of the cell was performed by the procedure of Comparative Example 1 with the results shown in Table 3. Charge-discharge cycles were continued until the discharge capacity diminished to 900 mAh (874 mAh/g of sulfur; 52% utilization), which was 56 cycles and the accumulated capacity 63 Ah.

Example 21

The electrolyte was that of Comparative Example 2 except that lithium nitrate at a concentration of 0.45 m (31.1 mg/g of solvent) was incorporated in the electrolyte solution. Cycling of the cell was performed by the procedure of Comparative Example 1 with the results shown in Table 3. Charge-discharge cycles were continued until the discharge capacity diminished to 900 mAh (874 mAh/g of sulfur; 52% utilization), which was 52 cycles and the accumulated capacity 57.4 Ah.

Example 22

The electrolyte was that of Example 20 except that the electrolyte solvent was a 80/20 mixture by weight of DOL and DME in place of DOL. Cycling of the cell was performed by the procedure of Comparative Example 1 with the results shown in Table 3. Charge-discharge cycles were continued until the discharge capacity diminished to 900 mAh (874 mAh/g; 52% utilization), which was 37 cycles and the accumulated capacity 40 Ah.

Example 23

The electrolyte was that of Example 21 except that the electrolyte solvent was a 80/20 mixture by weight of DOL and DME in place of DOL. Cycling of the cell was performed by the procedure of Comparative Example 1 with the results shown in Table 3. Charge-discharge cycles were continued until the discharge capacity diminished to 900 mAh (874 mAh/g of sulfur; 52% utilization), which was 63 cycles and the accumulated capacity 68.6 Ah.

TABLE 3

| Example | Additive (Concentration, molal, m) | Electrolyte Solvent | Sulfur Utilization | Charge-Discharge Efficiency |
|---|---|---|---|---|
| Comp. Ex. 2 | None | DOL | 54.5% | 80% |
| Example 20 | $LiNO_3$ (0.25 m) | DOL | 65.8% | 96.4% |
| Example 21 | $LiNO_3$ (0.45 m) | DOL | 66.6% | 97.6% |
| Example 22 | $LiNO_3$ (0.25 m) | DOL/DME | 66.7% | 97.7% |
| Example 23 | $LiNO_3$ (0.45 m) | DOL/DME | 66.7% | 97.8% |

Example 24

The electrolyte was that of Comparative Example 1 except that the electrolyte solution was a 3.6 m solution of lithium nitrate in a dioxolane/triglyme mixture (50/50 by weight). Discharge-charge cycling on the cell was performed at 50 mA/50 mA, respectively, with discharge cutoff at a voltage of 1.2 V and charge cutoff at 2.5 V. The discharge capacity at the $5^{th}$ cycle was 1725 mAh and specific capacity 1675 mAh/g of sulfur representing a utilization of 100%.

Example 25

The electrolyte was that of Comparative Example 1 except that the electrolyte solution was a 2.7 m solution of lithium nitrate in a dioxolane/diglyme mixture (50/50 by weight). Discharge-charge cycling on the cell was performed at 50 mA/50 mA, respectively, with discharge cutoff at a voltage of 1.2 V and charge cutoff at 2.5 V. The discharge capacity at the $5^{th}$ cycle was 1520 mAh and specific capacity 1485 mAh/g of sulfur representing a utilization of 88.7%.

Example 26

The electrolyte was that of Comparative Example 1 except that the electrolyte solution was a 1.5 m solution of lithium nitrate in a dioxolane/dimethoxyethane/triglyme mixture (50/25/25 by weight). Discharge-charge cycling on the cell was performed at 350 mA/200 mA, respectively, with discharge cutoff at a voltage of 1.8 V and charge cutoff at 2.5 V. The discharge capacity at the $5^{th}$ cycle was 1316 mAh and specific capacity 1278 mAh/g of sulfur representing a utilization of 76.3%.

Example 27

The electrolyte was that of Comparative Example 1 except that lithium nitrate at a concentration of 0.75 m was incorporated in a 0.75 m solution of lithium imide in a 50/50 mixture of DOL and DME as electrolyte. By the method of Comparative Example 1 five discharge-charge cycles were performed at 350 mA/200 mA, respectively, with discharge cutoff at a voltage of 1.8 V and charge cutoff at 2.5 V. Subsequent charge cycles were performed at a charge current of 200 mA to a 2.5 V cutoff. Discharge cycles 6 to 13 were carried out increasing discharge currents from 100 mA (cycle 6) to 8400 mA (cycle 13) as tabulated in Table 4. Sulfur utilization remained high, in excess of 65%, even at the very high discharge rate of 3600 mA (3.6 A), a current density of 4.26 mA/cm$^2$.

Example 28

The electrolyte was that of Comparative Example 1 except that lithium nitrate at a concentration of 0.75 m was incorporated in a 0.75 m solution of lithium imide in a 50/50 mixture of DOL and DME as electrolyte. By the method of Comparative Example 1 five discharge-charge cycles were performed at 350 mA/200 mA, respectively, with discharge cutoff at a voltage of 1.8 V and charge cutoff at 2.5 V. In the 6$^{th}$ charge cycle at a charge current of 200 mA the voltage was measured every 5 minutes, and change in voltage with time, dV/dt, in volts/minute was calculated for each 5 minute interval. The value of dV/dt until the cell voltage reached about 2.4 V was less than 0.002 V/min. As the cell reached about 2.5 V the value of dV/dt increased to 0.017 V/min and above 2.5 V dV/dt increased more to about 0.18 V/min.

TABLE 4

Specific Capacity and Utilization vs. Discharge Current

| Discharge Current (mA) | Specific Discharge Current (mA/g) | Discharge Current Density (mA/cm$^2$) | Specific Capacity (mAh/g) | Sulfur Utilization |
|---|---|---|---|---|
| 100 | 97 | 0.12 | 1302 | 77.7% |
| 350 | 340 | 0.41 | 1218 | 72.7% |
| 600 | 583 | 0.71 | 1141 | 68.1% |
| 1200 | 1165 | 1.42 | 1184 | 70.7% |
| 2400 | 2330 | 2.84 | 1126 | 67.2% |
| 3600 | 3495 | 4.26 | 1107 | 66.1% |
| 6000 | 5825 | 7.09 | 854 | 51.0% |
| 8400 | 8155 | 9.93 | 702 | 41.9% |

While the invention has been described in detail and with reference to specific and general embodiments thereof, it will be apparent to one skilled in the art that various changes and modifications can be made therein without departing form the spirit and scope of the inventions. Hence, the invention is not limited to the embodiments disclosed herein but is instead set forth in the following claims and legal equivalents thereof.

The invention claimed is:

1. An electrochemical cell compnsing:
    (a) a cathode comprising an electroactive sulfur-containing material;
    (b) an anode comprising lithium; and
    (c) a nonaqueous electrolyte, wherein the electrolyte comprises:
        (i) one or more nonaqueous solvents selected from the group consisting of acyclic ethers, cyclic ethers, polyethers, and sulfones;
        (ii) one or more lithium salts; and
        (iii) one or more N—O additives, wherein the one or more N—O additives comprises an inorganic nitrite selected from one or more of the group consisting of lithium nitrite, potassium nitrite, cesium nitrite, and ammonium nitrite.

2. The cell of claim 1 wherein the one or more N—O additives further comprise one or more of the group consisting of inorganic nitrates, organic nitrates, organic nitrites, and organic nitro compounds.

3. The cell of claim 2 wherein the organic nitro compound is selected from one or more of the group consisting of nitromethane, nitropropane, nitrobenzene, dinitrobenzene, nitrotoluene, dinitrotoluene, nitropyridine, dinitropyridine, nitrobutanes, and dialkyl imiazolium.

4. The cell of claim 1 wherein the one or more lithium salts is selected from one or more of the group consisting of LiSCN, LiCF$_3$SO$_3$, and LiN(CF$_3$SO$_2$)$_2$.

5. The cell of claim 1 wherein the concentration of the one or more N—O additives in the electrolyte is from about 0.02 m to 2.0 m.

6. The cell of claim 1 wherein the concentration of the one or more N—O additives in the electrolyte is from about 0.1 m to 1.5 m.

7. The cell of claim 1 wherein the concentration of the one or more N—O additives in the electrolyte is from about 0.2 m to 1.0 m.

8. The cell of claim 1 wherein the concentration of the one or more lithium salts in the electrolyte is from about 0.2 m to about 2.0 m.

9. The cell of claim 1 wherein the cyclic ether is selected from one or more of the group consisting of tetrahydrofuran, 2-methyl tetrahydrofuran, tetrahydropyran, 1,3-dioxolane, 1,3-dioxane, 1,4-dioxane, and trioxane.

10. The cell of claim 1 wherein the electroactive sulfur-containing material comprises greater than 75% by weight of sulfur.

11. The cell of claim 1 wherein the electroactive sulfur-containing material comprises elemental sulfur.

12. The cell of claim 1 wherein the anode comprises lithium metal.

13. The cell of claim 1 that further includes a separator disposed between the anode and the cathode.

14. The cell of claim 13 wherein the one or more N—O additives was included as part of the separator and was introduced into the electrolyte after the electrolyte came into contact with the separator.

15. A battery comprising a casing and one or more cells of claim 1.

16. The cell of claim 1 wherein the nonaqueous solvent comprises dioxolane.

17. The cell of claim 16 wherein the nonaqueous solvent comprises greater than 40% by weight dioxolane.

18. The cell of claim 1 wherein the one or more solvents consists of dimethoxyethane and dioxolane.

19. The cell of claim 1 wherein the one or more N—O additives was included as part of the cathode and was introduced into the electrolyte after the electrolyte came into contact with the cathode.

20. The cell of claim 1 wherein the one or more lithium salts are selected from one or more of the group consisting of LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$.

21. The cell of claim 1 wherein the nonaqueous electrolyte comprises two or more solvents selected from acyclic ethers, glymes and cyclic ethers.

22. The cell of claim 21 wherein one of the two or more non aqueous solvents is dioxolane.

23. The cell of claim 1 wherein the one or more non-aqueous solvents consist of:
- 1,3-dioxolane and dimethoxyethane; or
- 1,3-dioxolane and diethyleneglycol dimethyl ether; or
- 1,3-dioxolane and triethyleneglycol dimethyl ether; or
- 1,3-dioxolane and sulfolane.

24. The cell of claim 23 wherein the electrolyte comprises a binary mixture and the weight ratio of the components of the binary mixture are from about 5 to 95 to 95 to 5.

25. The cell of claim 23 wherein the non aqueous solvent comprises greater than 40% by weight dioxolane.

26. An electrochemical cell comprising:
(a) a cathode comprising an electroactive sulfur-containing material;
(b) an anode comprising lithium; and
(c) a nonagueous electrolyte, wherein the electrolyte comprises:
  (i) one or more nonagueous solvents selected from the group consisting of acyclic ethers, cyclic ethers, polyethers, and sulfones;
  (ii) one or more lithium salts; and
  (iii) one or more N—O additives;
  wherein the one or more lithium salts consist of LiSCN and LiN(CF$_3$SO$_2$)$_2$ and the N—O additive comprises lithium nitrate.

27. An electrochemical cell comprising:
(a) a cathode comprising an electroactive sulfur-containing material;
(b) an anode comprising lithium; and
(c) a nonagueous electrolyte, wherein the electrolyte comprises;
  (i) one or more nonagueous solvents selected from the group consisting of acyclic ethers, cyclic ethers, polyethers, and sulfones;
  (ii) one or more lithium salts; and
  (iii) one or more N—O additives, wherein the one or more N—O additives is lithium nitrate.

28. The cell of claim 27 wherein the concentration of the one or more N—O additives in the electrolyte is from about 0.02 m to 2.0 m.

29. The cell of claim 27 wherein the cyclic ether is selected from one or more of the group consisting of tetrahydrofuran, 2-methyl tetrahydrofuran, tetrahydropyran, 1,3-dioxolane, 1,3-dioxane, 1,4-dioxane, and trioxane.

30. The cell of claim 27 wherein the electroactive sulfur-containing material comprises elemental sulfur.

31. The cell of claim 27 wherein the anode comprises lithium metal.

32. The cell of claim 27 wherein the nonaqueous solvent comprises dioxolane.

33. The cell of claim 32 wherein the nonaqueous solvent comprises greater than 40% by weight dioxolane.

34. The cell of claim 27 wherein the nonaqueous electrolyte comprises two or more solvents selected from acyclic ethers, glymes and cyclic ethers.

35. The cell of claim 34 wherein one of the two or more non aqueous solvents is dioxolane.

36. The cell of claim 27 wherein the one or more nonaqueous solvents consist of:
- 1,3-dioxolane and dimethoxyethane; or
- 1,3-dioxolane and diethyleneglycol dimethyl ether; or
- 1,3-dioxolane and triethyleneglycol dimethyl ether; or
- 1,3-dioxolane and sulfolane.

37. The cell of claim 36 wherein the electrolyte comprises a binary mixture and the weight ratio of the components of the binary mixture are from about 5 to 95 to 95 to 5.

38. The cell of claim 37 wherein the non aqueous solvent comprises greater than 40% by weight dioxolane.

39. An electrochemical cell comprising:
(a) a cathode comprising an electroactive sulfur-containing material;
(b) an anode comprising lithium; and
(c) a nonagueous electrolyte, wherein the electrolyte comprises:
  (i) one or more nonagueous solvents selected from the group consisting of acyclic ethers, cyclic ethers, polyethers, and sulfones; and
  (ii) one or more N—O additives, wherein the one or more N—O additives comprises an inorganic nitrite selected from one or more of the group consisting of lithium nitrite, potassium nitrite, cesium nitrite, and ammonium nitrite.

40. The cell of claim 39 wherein the one or more N—O additives further comprises one or more of the group consisting of inorganic nitrates, and organic nitrates.

41. The cell of claim 39 wherein the concentration of the one or more N—O additives in the electrolyte is from about 0.2 m to 2.0 m.

42. The cell of claim 39 that further includes a separator disposed between the anode and the cathode.

43. The cell of claim 42 wherein the one or more N—O additives was included as part of the separator and introduced into the electrolyte after the electrolyte came into contact with the separator.

44. The cell of claim 39 wherein the one or more N—O additives was included as part of the cathoded and introduced into the electrolyte after the electrolyte came into contact with the cathode.

45. A battery comprising a casing and one or more cells of claim 39.

* * * * *